UNITED STATES PATENT OFFICE 2,143,751

HYDROGENATION OF AMIDES

Homer Adkins, Madison, Wis., assignor to Röhm & Haas Company, Philadelphia, Pa.

No Drawing. Application December 31, 1934, Serial No. 760,023. In Great Britain January 2, 1934

27 Claims. (Cl. 260—563)

This invention relates to a process for the hydrogenation of amides to amines.

A useful process for the reduction of amides to amines has apparently not been described. Maihle (Bull. Soc. Chim., (3) 35, 614 (1906)) reported the formation of ethyl and dimethyl amines from acetamide and of propyl and dipropylamines from propionamide in the vapor phase, Ni+$H_2$), but no details as to yields or purity of products were given. Guerbet (Zent., 1899 II 623) reported the formation of ethylamine from acetamide (Na+ROH), but Bouveault and Blanc (Compt. Rend., 138, 148 (1904)) obtained alcohols as the chief product from amides under similar conditions.

The transformation $$RCONH_2 + H_2 \rightarrow RCH_2NH_2 + H_2O$$

does not take place readily and is likely to go incompletely because the water formed in the reaction hydrolyzes unchanged amide with the formation of acid and ammonia. In the case of certain catalysts, this results in deactivation. It has now been found possible to bring about this reaction over a catalyst comprising copper oxide and chromium oxide. It has been found advantageous to use a reaction medium in which the water formed in the reaction is diluted and the hydrolysis of the amide rendered negligible. Dioxane (diethylene dioxide) is one of the media which can be used for this purpose.

The amides referred to above were prepared by the reaction of anhydrous ammonia or amines with an ester at 250° C.

Instead of using the amides themselves, it is also possible to use the ammonium salt of any given acid or the substituted ammonium salt, since these will be dehydrated with the consequent formation of the corresponding amide under the conditions of hydrogenation. It is also possible to use the acid and ammonia or substituted ammonia as the starting materials, since these will first combine to form the salt and subsequently dehydrate as indicated above.

The catalysts used in this process comprise in general, mixtures of oxides of hydrogenating metals with oxides of acid-forming metals with or without oxides of alkali and/or alkaline earth metals. The hydrogenating metals referred to, comprise copper, zinc, cadmium and silver. The acid-forming metals include chromium, vanadium and molybdenum. It has been found that catalysts containing an oxide of a hydrogenating metal and an oxide of an acid-forming metal give particularly good results when used with an oxide of the alkali and/or alkaline earth metals, such as, oxides of barium, calcium, and magnesium. It has been found that the most efficient catalyst is that containing oxides of copper, chromium, and one of the group of barium, calcium, and magnesium.

In the following examples, which are given by way of illustration and not limitation, the catalyst employed contained oxides of copper and chromium. Other hydrogenating metal oxides or mixtures, such as mentioned above, can be employed as can also oxides of other acid-forming metals.

The catalytic materials can be prepared by a simple mechanical mixture of the oxides or by precipitation from solutions of the nitrates. Other methods of preparation can be employed for the making of the catalyst, since it is only important to obtain an intimate mechanical mixture or chemical combination of the oxides.

In carrying out the hydrogenations, it has been found desirable to employ a solvent in which water and the amide are soluble and which will not alkylate the amine or bring about cleavage of the amide or deactivate the catalyst. Dioxane has been found to be particularly suitable for the reaction, but other solvents possessing the above characteristics can be employed.

*Example 1.*—53 g. of N-laurylpiperidine.

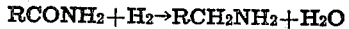

with 9 g. of a mixture of copper-oxide chromium-oxide, as a catalyst was allowed to react with hydrogen at 200° to 250° C. for two hours under a pressure of 200 to 300 atmospheres of hydrogen. 48.4 g. of N-dodecylpiperidine ($C_{12}H_{25}NC_5H_{10}$), B. P. 144–146/2 mm. was isolated by fractionation from the reaction mixture.

*Example 2.*—50 g. of N-sebacyclpiperidine

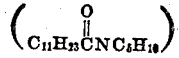

in 50 cc. of dioxane with 10 g. of a copper-oxide chromium-oxide catalyst was allowed to react with hydrogen as above for 1 hr. after which 43.9 g. of 1-10 dipiperidinodecane, B. P. 181–182/2 mm. was isolated.

*Example 3.*—45.5 g. of N-β-phenylethyl lauramide in 50 cc. of dioxane with 10 g. of a copper-oxide chromium-oxide catalyst was allowed to react as in Example 2 and 28.8 g. of dodecyl β-phenylethylamine, B. P. 182–184° C. was isolated. Small quantities of lauryl alcohol and a tertiary amine were also isolated.

*Example 4.*—20 g. of lauramide in 50 cc. of dioxane with 4 g. of a copper-oxide chromium-oxide catalyst was allowed to react under 300 atmospheres of hydrogen at 250° C. for 1 hour. 9.2 g. of dodecylamine, B. P. 123–125/3 mm. was isolated together with a similar amount of di-dodecylamine, M. P. 68°.

In addition to the above the following amides have also been hydrogenated in the presence of dioxane at about 250° C. and pressures ranging from 200 to 300 atmospheres, using a copper-oxide chromium-oxide catalyst.

In the table, the first column indicates the amide used; the second, the number of mols in the charge; the third, the amount of catalyst in grams; the fourth, the time in hours and the fifth contains the products obtained by the hydrogenation and indicates either the boiling point or melting point of these products.

time this temperature had been obtained, and this is indicated in the above table by "0".

It will be noted that in nearly all cases, more than one product is obtained, and that these are not confined entirely to amines. This is due to the fact that there are three points in amides which are susceptible to attack by hydrogenation under the conditions given above. These are indicated by the following skeleton formula:

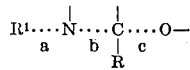

In the case of unsubstituted amides, the "c" linkage is most easily broken with the consequent formation of amines. In mono or di substituted amides, all three of the linkages may be broken according to conditions. For instance, in case R and $R^1$ are alkyl groups, the break occurs at the "a" linkage much more easily and probably

Table

| Amide | Mols | Amt. cat. | Time, hours | Product | Yield |
|---|---|---|---|---|---|
| | | | | | *Percent* |
| Heptamide, M. P. 95–96° | 0.19 | 6 | 7.5 | n-Heptylamine, B. P. 149–153°/740 mm | 39 |
| | | | | Di-n-heptylamine, 134–6°/9 mm | 58 |
| γ-Hydroxy valeramide | 0.5 | 10 | 0 | Valerolactone, B. P. 96–8°/13 mm | 74 |
| | | | | 4-hydroxy-1-amino pentane, B. P. 119–121°/8 mm | 16 |
| α-Phenyl butyramide, M. P. 72–80° | 0.33 | 10 | 1 | 2-phenyl-1-aminobutane, B. P. 105–6°/3 mm | 72 |
| | | | | Products boiling, 163–167°/3–4 mm | 23 |
| N-n-amyl lauramide | 0.22 | 10 | 0 | Di-n-amylamine, 6 p. 100–8°/25 mm | 8 |
| | | | | n-Dodecylamine, 135–8°/10 mm | 15 |
| | | | | n-Dodecyl-n-amylamine, B. P. 175–7°/10 mm | 35 |
| | | | | Di-n-decylamine | 42 |
| N-di-ethyl lauramide | 0.015 | 8 | 0.5 | n-Dodecyl-ethylamine, B. P. 124–9°/2 mm | 64 |
| | | | | Di-n-dodecylamine, M. P. 51–53° | 30 |
| N-di-ethyl heptamide, B. P. 106–7°/2 mm | 0.30 | 10 | 1 | n-Heptylethylamine, b. p. 81–3°/16 mm | 64 |
| | | | | n-Heptyldiethylamine, 86–7°/16 mm | 4 |
| | | | | Di-n-heptylamine, 129–36/9 mm | 25 |
| N-β-phenylethyl heptamide | 0.23 | 10 | 0.3 | Ethyl benzene | 5 |
| | | | | n-Heptyl amine, B. P. 147–52°/740 mm | 7 |
| | | | | β-Phenyl ethylamine, 80–4°/10 mm | 6 |
| | | | | Di-n-heptyl amine, 131–6°/9 mm | 10 |
| | | | | n-Heptyl-β-phenylethylamine, 151–7°/9 mm | 56 |
| N-phenyl lauramide | 0.18 | 10 | 3.25 | Aniline B. P., 58–65°/9 mm | 29 |
| | | | | Di-phenylamine, 109–12/2 mm., M. P. 49–52° | 5 |
| | | | | n-Dodecylamine, 119–120°/2 mm | 14 |
| | | | | n-Dodecylphenylamine, 160–1°/2 mm | 37 |
| N-cyclohexyl-lauramide | 0.20 | 10 | 0 | Di-n-dodecylamine | 2 |
| | | | | Cyclohexylamine, 125–30°/740 mm | 15 |
| | | | | Di-cyclohexylamine and some dodecylamine, 110–6°/3 mm | 16 |
| | | | | n-Dodecyclohexylamine, 158–9°/2 mm | 62 |
| | | | | Di-n-dodecylamine, M. P. 53–55° | 24 |
| Salicylamide, M. P. 137° | 0.33 | 9 | 2 | o-Cresol, B. P. 77–9°/10 mm | 80 |
| Succinamide, M. P. 252° | 0.34 | 11 | 5.5 | Pyrrolidine (isolated as the hydrochloride) | 25 |
| | | | | N-4-amino-n-butyl pyrrol-idine, B. P. 83–5°/8 mm | 14 |
| N-n-amyl-adipamide | 0.20 | 11 | 4 | N-4-amino-n-butyl succinmide, 120–4°/3 mm | 15 |
| Tetrahydrofuroamide, M. P. 76–8° | 0.30 | 8 | 2 | Di-n-amylamine, B. P. 95–9°/13 mm | 90 |
| | | | | Tetrahydrofurfurylamine 64–6°/8 mm | 60 |
| N-n-amyl succinimid | 0.21 | 6 | 0.5 (200°) | Di-tetrahydrofurfurylamine, 126–8°/9 mm | 33 |
| | | | | N-n-amyl pyrrolidine, 174–7°/740 | 88 |
| N-β-phenylethyl succinimide | 0.25 | 10 | 0.6 | Ethyl benzene, 139–3°/740 | 13 |
| | | | | N-β-phenylethyl pyrrolidine, 113–15°/9 mm | 65 |
| N-n-amyl phthalimide, B. P. 152°/2 mm | 0.30 | 12 | 5.5 | β-β¹ Hexahydrobenzopyrrolidine, 65–70°/8–9 mm | 8 |
| | | | | N-n-amyl β-β¹ hexahydrobenzopyrrolidine, 104–6°/3 mm | 52 |
| N-β-phenylethylphthalimid, M. P. 130–131° | 0.20 | 10 | 3.7 | Ethyl benzene 134–6°/740 mm | 22 |
| | | | | β-β¹ Hexahydrobenzopyrrolidine, 65–70°/9 mm | 16 |
| | | | | β-(Phenylethyl)-β,β¹ hexahydrobenzopyrrolidine, 135–8°/3 mm. | 39 |
| N-heptoyl piperidine | 0.20 | 8 | 0 | Heptyl alcohol 70–80°/9 mm | 5 |
| | | | | N-n-heptyl piperidine, 102–4°/9 mm | 92 |
| Nonanoyl piperidine | 0.11 | 5 | 0 | N-n-nonyl piperidine, 135–7°/11 mm | 88 |
| β-Hydroxy butyryl piperidine | 0.14 | 5 | 1 | Butyl piperidine, 160–170°/740 mm | 56 |
| αα Dimethyl-β-hydroxy butyryl piperidine | 0.20 | 8 | 1.5 | Piperidine | 29 |
| | | | | Iso-butyl piperidine, 159–61°/740 | 64 |
| α-Phenyl butyryl piperidine | 0.25 | 10 | 0.5 | 2-phenyl butanol-1, 112–4°/8 mm | 32 |
| | | | | 1-piperidino-2-phenyl butane, 134–5°/8 mm | 65 |
| Succinyl piperidine, M. P. 68–69° | 0.12 | 7 | 2.3 | Butandiol 1–4, 113–20°/8 mm | 15 |
| | | | | 1–4 dipiperidino butane 133°/3 mm | 80 |
| Adipyl piperidine | 0.1 | 6 | 2 | Hexandiol 1–6, 126–8°/2 mm | 16 |
| | | | | 1-6 dipiperidino hexane, 147–9°/2 mm | 80 |
| Benzoyl piperidine, B. P. 151–2°/3 mm | 0.33 | 10 | 4 | Toluene, 108–9°/740 mm | 79 |
| | | | | Benzyl alcohol, 85–90°/9 mm | 3 |
| Furoyl piperidine, M. P. 58–9° | 0.20 | 6 | 0 | Tetrahydrofurfuryl alcohol, 65–8°/9 mm | 3 |
| | | | | N-tetrahydrofururyl piperidine, 92–4°/6 mm | 85 |
| Ammonium laurate | 0.12 | 8 | 4 | n-Dodecylamine 123–5°/2 mm | 14 |
| | | | | di-n-dodecylamine M. P. 55–56° | 79 |
| Di-N-β-phenylethyl lauramide | 0.08 | | 0 | Dodecyl-di-β-phenylethylamine | 70 |

The "time" in the above table is calculated from the time at which the temperature of the material in the bomb reached 250° C. In some instances the hydrogenation was complete by the time this temperature had been obtained, and to the exclusion of a break at the "b" linkage. This may be seen from the proportion of products obtained from N-n-amyl lauramide, N-diethyl lauramide and N-diethyl heptamide. In cases where R¹ is a cyclohexyl or betaphenyl ethyl group, the break occurred predominantly at "a" but a considerable amount occurred also at "b." When R is phenyl the break at the "b" linkage predominates.

The pressures and temperatures given in the foregoing examples are the preferred temperatures. The hydrogenation, however, may be carried out under other conditions and we have found that the pressure may be varied from 50 to about 500 atmospheres and the temperatures from 150 to about 350° C.

The process may also be carried out in a continuous flow system with equally good results.

This application is a continuation-in-part of prior application Serial No. 556,710 filed August 12, 1931.

I claim:

1. The process of hydrogenating amides comprising treating them with hydrogen at hydrogenating temperatures and pressures in the presence of, as a catalyst, an oxide of a hydrogenating metal.

2. The process of hydrogenating amides comprising treating them with hydrogen at hydrogenating temperatures and pressures in the presence of, as a catalyst, an oxide of a hydrogenating metal and an oxide of an acid-forming metal.

3. The process of hydrogenating amides comprising treating them with hydrogen at hydrogenating temperatures and pressures in the presence of, as a catalyst, an oxide of a hydrogenating metal, an oxide of an acid-forming metal, and an oxide of one of the group consisting of barium, calcium and magnesium.

4. The process of hydrogenating amides comprising treating them with hydrogen at hydrogenating temperatures and pressures in the presence of, as a catalyst, copper oxide and chromium oxide.

5. The process of hydrogenating amides comprising treating them with hydrogen at hydrogenating temperatures and pressures in the presence of, as a catalyst, copper oxide, chromium oxide, and barium oxide.

6. The process of hydrogenating amides comprising treating them with hydrogen at hydrogenating temperatures and pressures in the presence of, as a catalyst, an oxide of a hydrogenating metal, and an inert liquid which is a solvent for water and the amide.

7. The process of hydrogenating amides comprising treating them with hydrogen at hydrogenating temperatures and pressures in the presence of, as a catalyst, an oxide of a hydrogenating metal, and a liquid which is a solvent for water and the amide, said liquid being inert chemically towards the amide and its hydrogenation products.

8. The process of hydrogenating amides comprising treating them with hydrogen at hydrogenating temperatures and pressures in the presence of, as a catalyst, an oxide of a hydrogenating metal, and dioxane.

9. The process of hydrogenating amides comprising treating them with hydrogen at hydrogenating temperatures and pressures in the presence of dioxane and, as a catalyst, an oxide of a hydrogenating metal and an oxide of an acid-forming metal.

10. The process of hydrogenating amides comprising treating them with hydrogen at hydrogenating temperatures andd pressures in the presence of dioxane and, as a catalyst, an oxide of a hydrogenating metal, an oxide of an acid-forming metal, and an oxide of one of the group consisting of barium, calcium and magnesium.

11. The process of hydrogenating amides comprising treating them with hydrogen at temperatures of from 150 to 350 degrees C. and pressures of from 50 to 500 atmospheres in the presence of, as a catalyst, an oxide of a hydrogenating metal.

12. The process of hydrogenating amides comprising treating them with hydrogen at temperatures of from 150 to 350 degrees C. and pressures of from 50 to 500 atmospheres in the presence of, as a catalyst, an oxide of a hydrogenating metal and an oxide of an acid-forming metal.

13. The process of hydrogenating amides comprising treating them with hydrogen at temperatures of from 150 to 350 degrees C. and pressures of from 50 to 500 atmospheres in the presence of, as a catalyst, on oxide of a hydrogenating metal, an oxide of an acid-forming metal, and an oxide of one of the group consisting of barium, calcium and magnesium.

14. The process of hydrogenating amides comprising treating them with hydrogen at temperatures of from 150 to 350 degrees C. and pressures of from 50 to 500 atmospheres in the presence of, as a catalyst, copper oxide, chromium oxide and barium oxide.

15. The process of hydrogenating amides comprising treating them with hydrogen at temperatures of from 150 to 350 degrees C. and pressures of from 50 to 500 atmospheres in the presence of dioxane and, as a catalyst, an oxide of a hydrogenating metal.

16. The process of hydrogenating amides comprising treating them with hydrogen at temperatures of from 150 to 350 degrees C. and pressures of from 50 to 500 atmospheres in the presence of dioxane and, as a catalyst, an oxide of a hydrogenating metal and an oxide of an acid-forming metal.

17. The process of hydrogenating amides comprising treating them with hydrogen at temperatures of from 150 to 350 degrees C. and pressures of from 50 to 500 atmospheres in the presence of diozane and, as a catalyst, an oxide of a hydrogenating metal, an oxide of an acid-forming metal and an oxide of one of the group consisting of barium, calcium and magnesium.

18. The process of preparing amines which comprises treating an acid amide with hydrogen at hydrogenating temperatures and pressures in the presence of an inert solvent and, as a catalyst, an oxide of a hydrogenating metal.

19. The process of preparing amines which comprises treating the ammonium salt of an organic acid with hydrogen at hydrogenating temperatures and pressures in the presence of an inert solvent and, as a catalyst, an oxide of a hydrogenating metal.

20. The process of hydrogenating the unsubstituted carboxylic acid amide of a soap-forming fatty acid which comprises heating said amide, in an inert organic solvent, at a temperature of about 250° C. and at a pressure of about 200 atmospheres with hydrogen in the presence of a copper oxide hydrogenation catalyst.

21. The process of producing amines, which comprises heating a compound selected from the group consisting of carboxylic acid amides and carboxylic acid imides, while admixed with hydrogen, to a temperature in excess of 200° C., at a pressure between about 50 and about 500 atmospheres and in the presence of an oxide of a hydrogenating metal and an oxide of an acid-forming metal.

22. The process of producing amines, which comprises heating a compound selected from the group consisting of carboxylic acid amides and carboxylic acid imides, while admixed with hydrogen, to a temperature in excess of 200° C., at a pressure between about 50 and about 500 atmospheres and in the presence of an oxide of a hydrogenating metal, an oxide of an acid-forming metal, and magnesium oxide.

23. The process of producing amines, which comprises heating a compound selected from the group consisting of carboxylic acid amides and carboxylic acid imides, while admixed with hydrogen to a temperature in excess of 200° C., at a pressure between about 50 and about 500 atmospheres in the presence of a hydrogenation catalyst.

24. The process of claim 23 characterized in that the process is carried out in an inert water miscible organic medium.

25. The process of claim 23 characterized in that the process is carried out in dioxane.

26. The process of hydrogenating a phthalimide which comprises heating said imide at about 250° C. under a pressure of from about 50 to about 500 atmospheres with hydrogen in the presence of a copper oxide hydrogenation catalyst.

27. The process which comprises hydrogenating succinamide at about 250° C. under a pressure of from about 50 to about 500 atmospheres with hydrogen in the presence of a copper oxide hydrogenation catalyst.

HOMER ADKINS.